DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 5

T886,005
PRINTING INKS

Leon Edward Wolinski, Buffalo, N.Y., assignor to E. I. du Pont de Nemours and Company, Wilmington, Del.

Filed Dec. 17, 1969, Ser. No. 886,032
Int. Cl. C08h *9/00;* C09d *3/26, 11/06*
U.S. Cl. 106—27
No Drawing. 6 Pages Specification

A fast-drying printing ink useful in commercial lithographic printing and particularly useful in printing folded cartons and the like.

The ink comprises:

(A) a pigment;

(B) about 5–33 percent of an organic acid having from 8–20 carbon atoms and at least one set of conjugated double bonds such as an $\alpha$ or $\beta$ form of oleostearic acid or a mixture of organic acids such as China oil;

(C) about 1.5–20 percent of a drying composition such as a solution of cobalt salts of aliphatic acids having from 4–40 carbon atoms, preferably $C_8$–$C_{10}$ for an optimum balance of properties and particularly preferred is a 12 percent solution of a cobalt salt complex of a branched $C_{10}$ aliphatic acid; and (D) up to about 30 percent plasticizer such as an ether phthalate selected from bis(2-ethoxyethyl) phthalate, bis(2-methoxyethyl) phthalate, butyl benzyl phthalate,